Feb. 27, 1934.  G. P. BERRY  1,948,487
STEERING MECHANISM
Filed May 27, 1931  2 Sheets-Sheet 1
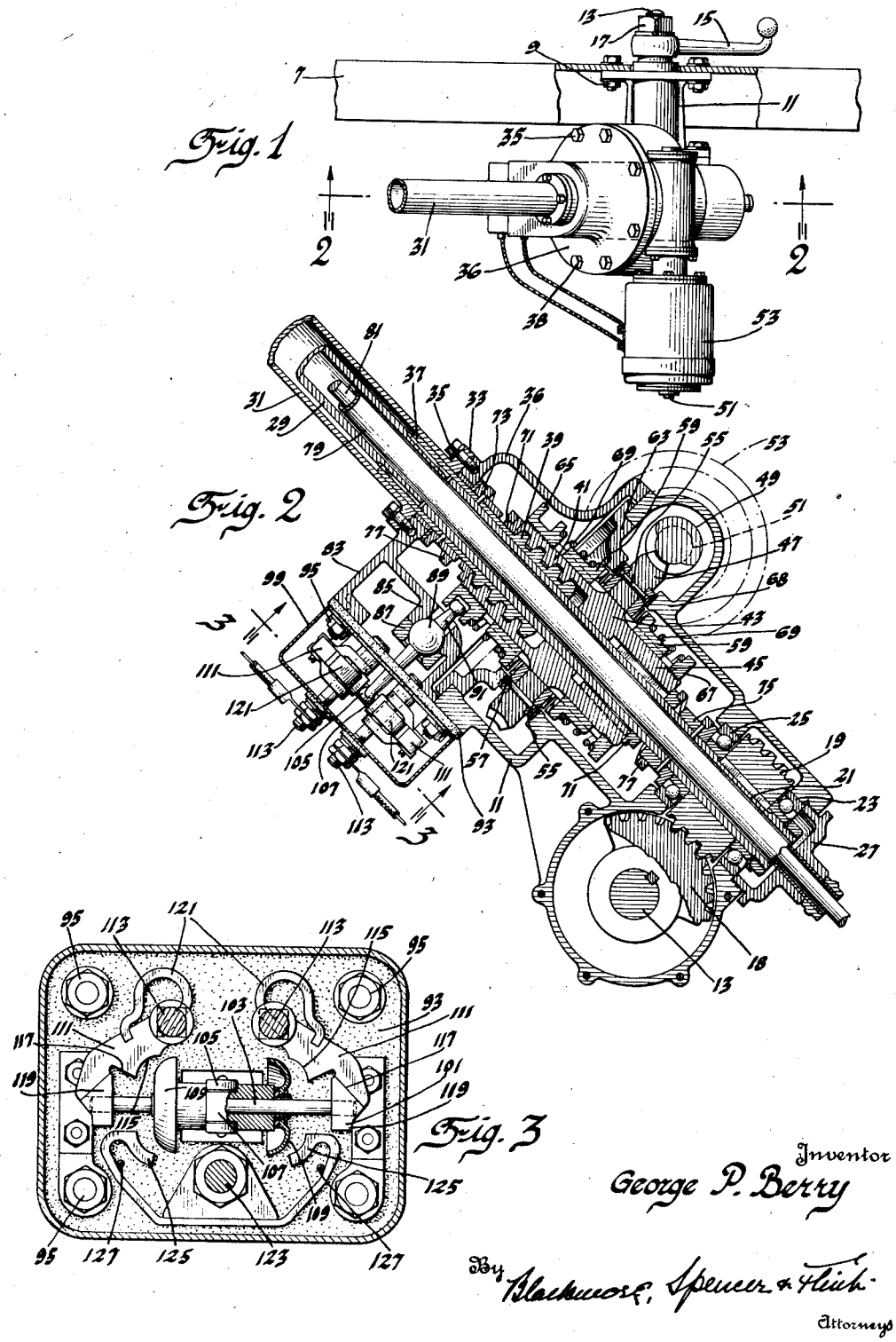
Inventor
George P. Berry
By Blackmore, Spencer & Fiuh
Attorneys Feb. 27, 1934.  G. P. BERRY  1,948,487
STEERING MECHANISM
Filed May 27, 1931   2 Sheets-Sheet 2

Inventor
George P. Berry
By Blackmore, Spencer & Hath
Attorneys

Patented Feb. 27, 1934

1,948,487

UNITED STATES PATENT OFFICE 1,948,487

STEERING MECHANISM

George P. Berry, Detroit, Mich., assignor to General Motors Research Corporation, Detroit, Mich., a corporation of Delaware Application May 27, 1931. Serial No. 540,298

13 Claims. (Cl. 180—79.1)

This invention relates to steering apparatus for vehicles and more particularly to a power device to supplement the effort applied manually for turning the steering wheel.

An object of the invention is to use an electric motor, comparable to the electric motor used for car starting, as an aid to steering.

As a further object the invention provides for a free wheel relationship between certain of the parts used in connection with the manual steering and certain parts designed to introduce power steering.

Other objects and advantages will be understood from the following description.

It should be explained that a motor of the starter variety, a series wound motor, develops its highest torque at low speed and is well suited for the above purpose of power steering. If such a motor is directly coupled to the steering gear mechanism the drain on the battery of the car would be excessive, even if the motor were used for steering only when parking the vehicle or at peak loads. Reduction gearing is therefore necessary and is used with the motor. When such reduction gearing is used a worm drive would be irreversible. Furthermore, any reduction gearing would seriously increase the normal manual effort of steering owing to friction drag of the motor. To avoid thus disadvantageously increasing the manual effort, a free wheel connection is used with irreversible gearing. It is this free wheel expedient which constitutes one very marked improvement involved in the present invention.

In the drawings—

Fig. 1 is a top plan view showing the lower end of the steering post, the motor and the gear housing.

Fig. 2 is a longitudinal section on line 2—2 of Fig. 1.

Fig. 3 is a section on line 3—3 of Fig. 2.

Figures 4, 5:
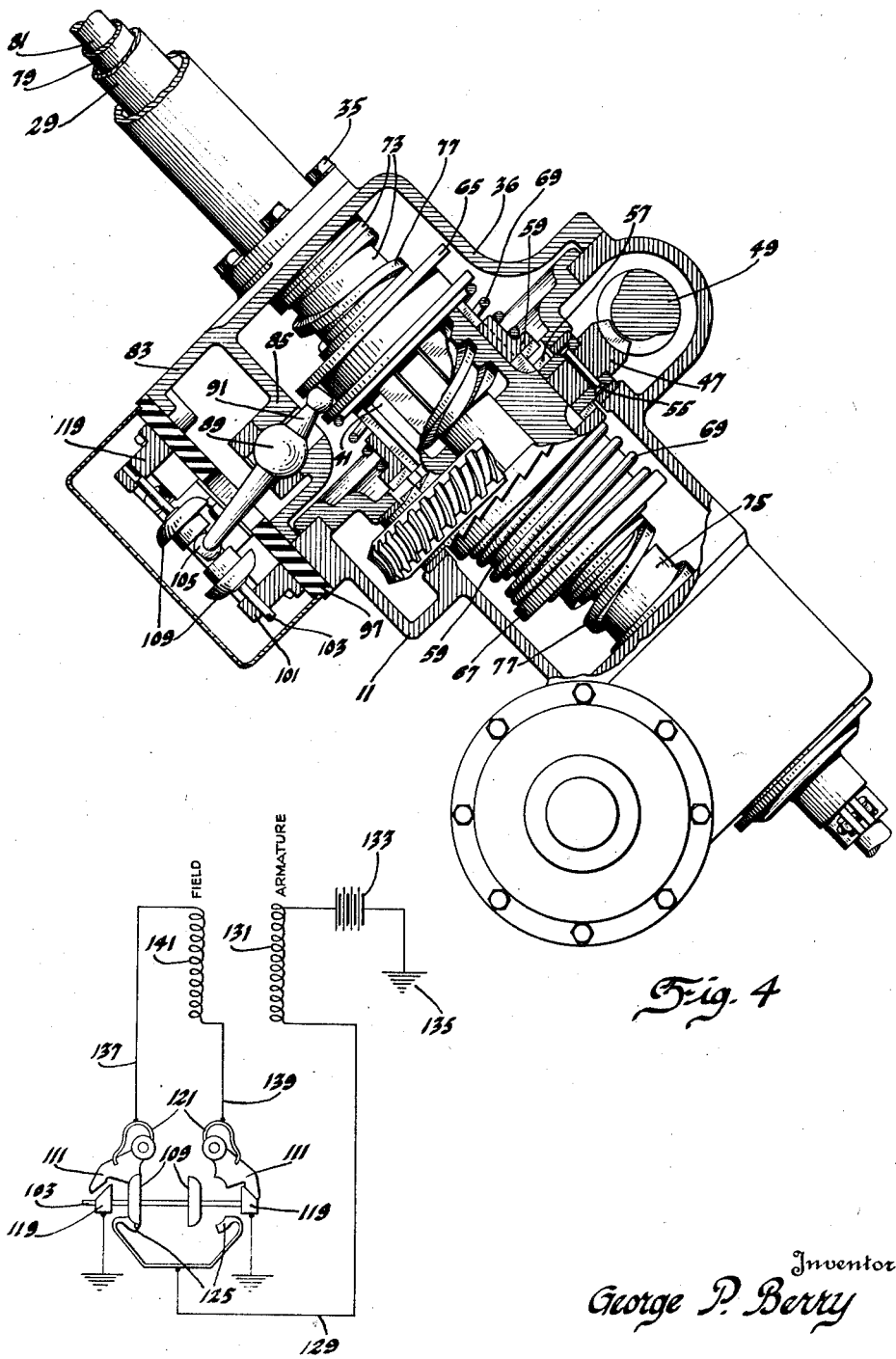
Fig. 4 is a view partly in elevation and partly broken away and in section, this view showing the steering mechanism with the clutch for power driving in engaged position.
Fig. 5 is a diagrammatic view of the electrical circuits.

Referring by reference characters to the several figures of the drawings, numeral 7 is a part of the chassis frame of the vehicle. To the frame 7 is secured by fastening means 9 a casting 11 carrying the novel steering mechanism. A shaft 13 is rotatably mounted in casting 11 and this shaft is provided with a lever arm 15 secured by a nut 17. Lever arm 15 is to be connected to any preferred kind of steering linkage for turning the wheels.

Keyed to shaft 13 within the housing is a gear member 18 which is in mesh with a cooperating gear member 19, the latter keyed to a tubular shaft 21. This shaft 21 is rotatably supported by bearings 23 and 25 in the tubular lower end of casting 11. A cap 27 closes the lower end of this portion of the casting. Rotation of tubular shaft 21 rocks the shaft 13 through the instrumentality of gearing elements 19 and 18, thus serving to rock the arm 15 and steer the vehicle.

Tubular shaft 21 is in alignment with the coaxial tubular steering tube or column 29. This column is positioned within the conventional column jacket 31. It will be understood that the steering column 29 is to be rotated by the usual hand steering wheel, not shown. The end of the column jacket 31 has a flange 33 which is secured by fastening means 35 to a separable cover 36 which is secured by fastening means 38 to the casting 11. At the lower end of the steering column 29 and coaxial therewith is a sleeve 37 which is keyed to the steering column. The sleeve 37 surrounds the before-mentioned tubular shaft 21 and ends in a screw 39. A nut 41 has threads cooperating with the screw 39 at one of its ends. The intermediate part of the nut has a portion 43 with a circular opening whereby the intermediate part of the nut encircles the tubular shaft 21. The other end 45 of the nut is keyed to shaft 21 to permit longitudinal sliding, but to prevent rotation relative to shaft 21. Freely encircling the mid portion 43 of the nut is a gear element 47. This gear element 47 is in mesh with a gear element 49. The gear element 49 is on a shaft 51 of a motor 53, the motor being secured to the casting 11 in such a position that gear element 49 of its shaft may engage the gear element 47. It will be observed that owing to the free rotary support of gear element 47 on nut 41 the motor cannot rotate the nut or be rotated by the rotation of the nut through the parts thus far described.

Fastening means 55 secure, one to each side of the gear element 47, clutch members 57. These clutch members have saw-type clutch teeth to engage similar teeth on cooperating clutch members 59 slidably and non-rotatably mounted around the end portions of the nut 41. Gear element 47 is held from movement axially by a wall 68 constituting a part of the housing on one side, and by a separable wall element 63 on the other side. At one end of the nut 41 is a collar 65 and at the other end is a ring 67, the ring and the collar being in threaded relation with the nut. Between the sliding clutch members and the nut and collar respectively, are coil springs 69. Between spring abutments 71, one at each end of the nut 41, and other abutments 73 engaging the cover 36 adjacent the flange 33 and the nut 75 adjacent the bearing 25 are heavy coil springs 77. Although constituting no part of this invention, there are shown on the drawings, and within the steering tube coaxial rigid and tubular shafts, the tubular shaft 79 being intended for operating the engine throttle and the solid shaft 81 being intended for controlling the lights.

At 83 is a hollow extension formed as an integral part of cover 36, the extension 83 having an intermediate wall 85 which cooperating with a cap 87 forms a spherical socket for a ball 89 serving as the fulcrum for a lever 91. One end of the lever engages the collar 65 carried by the nut 41. The other end of the lever extends out from the extension 83 and into a switch box which controls the motor 53. A switch base 93 is secured to the extension 83 and to the casting by fastening means 95, said base being suitably insulated from the extension and casting. A cap 99 serves to house the switch elements. Secured to the base by certain of the fastening means 95 are guides 101 for a reciprocating rod 103. The forked ends 105 of the lever 91 engage about the intermediate reduced part of a block 107 on the rod. The rod also carries spaced concavo-convex contact members 109. Levers 111 are pivoted to swing on posts 113. The levers have arcuate surfaces 115 to engage contact members 109 and also have flat faces 117 to engage similar surfaces on contact members 119 which latter are to be electrically grounded in any convenient way as shown in the diagrammatic view, Fig. 5. Springs 121, anchored in the posts 113, engage the levers and normally hold them in engagement with the ground contact 119. Secured to the base by fastening means 123 is a spring plate having curved ends 125 so shaped as to conform to the curvature of the contact members 109. Pins 127 serve to limit the movement of the plate 125 as illustrated. From the fastening means 123 and the spring plate a wire 129 extends to and through the armature coil 131 of the motor. From this armature coil a wire extends to the battery 133, preferably the battery of the car, and from the battery is a connection to the ground as at 135. A lead 137 extends from one lever and a similar lead 139 extends from the other lever. These two leads 137 and 139 are connected to opposite ends of the field coil 141. It will be seen from examination of Fig. 5 that the current flowing through the armature coil always in one direction also flows through the field coil now in one direction and now in the other, depending upon the position of the rod 103 and the contact members 109 with reference to the levers 111 and the contact plates 125. In this way the direction of rotation of the rotor of the motor and its shaft 49 is reversible for steering the vehicle in the one or the other direction as may be required.

The operation of the mechanism described above is as follows. When the steering tube 29 is rotated by the hand wheel it rotates the sleeve 37 and screw 39. The nut 41 tends to slide to the right or to the left, depending upon the direction of rotation of the tube 29, the springs 77 resisting the sliding movement. The resistance to the sliding of the nut ordinarily compels the nut to rotate together with the screw and without reciprocation, and this rotation causes a rotation of the tubular shaft 21 and the steering of the road wheels through the instrumentality of gearing 19, 18. Such steering movements are not accompanied by a rotation of the rotor of the motor through gearing 47 and 49 because of the free wheel connection between the nut 41 and the gear 47. Manual steering in this way takes place in ordinary driving. It is only when parking or under excessive loads that the motor comes into action to assist the manual efforts. Should the steering resistance at the wheels be such that the rotation of the screw can more easily slide the nut against the pressure of a spring 77 than rotate the nut and steer the wheel, such sliding will take place. The sliding will cause engagement of the teeth of the clutch elements associated with the gear 47 and one of the sliding members 59. The sliding of the nut which produces this clutch engagement may or may not be enough to rock lever 91 sufficiently to make contact element 109 engage between one of the levers 111 and the adjacent member 125. If not enough to make this contact, the steering continues to be purely manual and the teeth of the sliding clutch member 59 merely slip over the teeth of the cooperating clutch member on gear 47, the slipping being permitted by the compression of one of the springs 69. If the sliding is enough to make contact member 109 engage the lever 111 and the member 125, a current is established as will be clear from Fig. 5, which current energizes the motor. The motor then operates through the reduction gearing 49, 47 to turn nut 41 and steer the wheels. If the hand wheel and the steering tube 29 continue to be turned manually to follow up the rotation of the nut under the influence of the power steering, the power steering continues. Otherwise the nut overruns the screw and breaks the circuit through the motor, and further steering is by hand. The motor is therefore used only when the effort is greater than normal as when turning the wheels of the vehicle when it is at rest or under other unusual conditions. When the motor is not in use the hand steering is not accompanied by the rotation of the rotor of the motor through the gearing 47, 49 because of the provision of the free wheel connection between 47 and 41. Easy steering is therefore not interfered with. The reduction gearing together with the provision for cutting out the actions of the motor except under peak loads makes it possible to use such a power device without excessively draining the battery of the car.

I claim:

1. In combination with a primary mechanism to be operated, a primary operating means therefor adapted to move the said primary mechanism in either of two opposite directions, a normal inoperative secondary power driven operating means adapted to engage directly and move the said primary mechanism in either of two opposite directions, secondary mechanism operable in response to a predetermined resistance to movement of the primary mechanism to cause the secondary operating means to operate, and a normally disconnected connection between said primary and secondary means, whereby said primary means may operate said mechanism without overcoming resistance in the secondary means, said secondary mechanism including clutch elements.

2. In combination with a primary mechanism to be operated, a primary operating means therefor adapted to move the said primary mechanism in either of two opposite directions, a normal inoperative secondary power driven operating means adapted to engage directly and move the said primary mechanism in either of two opposite directions, secondary mechanism operable in response to a predetermined resistance to movement of the primary mechanism to cause the secondary operating means to operate, and a normally disconnected connection between said primary and secondary means, whereby said primary means may operate said mechanism without overcoming resistance in the secondary means, said power driven means including an electric motor, and said secondary mechanism including clutch elements whereby said secondary means is operable upon said primary mechanism, and an automatically operated switch for said electric motor.

3. In combination with primary mechanism to be operated which is movable in opposite directions from a neutral position, a primary operating means adapted to move the said primary mechanism in either direction, a normally inactive reversing electric motor, means operable thereby for moving the primary mechanism in either direction, a plurality of electric switches, automatically operable means whereby excessive resistance offered by the primary mechanism to movement by the primary operating means will render active the electric motor through one or the other of said switches, and a normally disconnected free wheel connection between said primary operating means and part of the means operable by the electric motor, whereby the primary operating means may operate without overcoming the resistance of the motor when the motor is inactive.

4. In combination with driven mechanism mounted for rotation in opposite directions, a manually operable rotatable member, an associated member mounted to simultaneously rotate and reciprocate relative to the manually operable member, said associated member being mounted for reciprocation relative to said driven mechanism but non-rotatable relative thereto, yielding means to prevent said simultaneous relative reciprocation and rotation of said associated member and to cause it to rotate together with the manually operable member whereby the manually operable member operates said driven mechanism through the instrumentality of said associated member, and power operated means operable automatically upon said associated member and driven mechanism when the yielding means is overcome by excessive resistance offered by the driven mechanism.

5. The invention defined by claim 4, said associated member being constituted by a nut in threaded relation to said manually operable member, said threaded connection being designed to provide said simultaneous relative movements.

6. The invention defined by claim 4, said power-operated means including a motor and reduction gearing, one of the gear elements of said gearing being normally free from but adapted to be clutched to said associated member upon the reciprocation of said member against the resistance of said yielding means.

7. The invention defined by claim 4, said power-operated means including a motor and reduction gearing, one of the gear elements of said gearing being normally free from but adapted to be clutched to said associated member upon the reciprocation thereof against the resistance of said yielding means, and an electric switch operated by the reciprocation of said associated member to close the electric circuit through said electric motor.

8. The invention defined by claim 4, said power-operated means including a motor and cooperating gearing, one of the gear elements of said gearing being normally free from but adapted to be clutched to said associated member upon the reciprocation thereof against the resistance of said yielding means, said clutch device comprising clutch members associated with said one of said gear elements and spring-held opposed clutch elements slidable relative to said associated member, and an electric switch operated by reciprocation of said associated member to close an electric circuit through said motor after the clutch elements have been engaged and one of said springs compressed.

9. In a combined manual and power steering device, manually operable means to effect steering including an intermediate part, power means including a motor and a driven part normally free from driving engagement with the first-mentioned part, yielding means to normally prevent the operation of the power means, clutch means between said parts operable in response solely to an excessive resistance being offered to said manually operable means.

10. The invention defined by claim 9, said clutch means rendered active by a reciprocation of said intermediate part relative to the power driven part and yielding means to prevent said reciprocation and to prevent said clutch engagement prior to the existence of a predetermined resistance to steering.

11. In a combined manual and power steering device, a driven shaft, a manually operable shaft, an intermediate member mounted for simultaneous reciprocable and rotary movements relative to said manually operable shafts and a reciprocable but non-rotatable connection with a driven shaft, a motor, reduction gearing driven by the motor, automatically operable clutches between the intermediate member and one of the gears of the reduction gearing and engageable upon a movement of reciprocation of the intermediate member, and yielding means to prevent said reciprocation and clutch engagement except when the rotation of the driven shaft offers a predetermined resistance.

12. The invention defined by claim 11 together with electric switch means and a lever rocked by said movement of reciprocation, said lever actuating said switch to close an electric circuit through said motor.

13. In a power steering gear for motor vehicles, a steering shaft, power mechanism for moving said steering shaft, a clutch for engaging the power mechanism with the steering shaft, yielding means to resist engagement of said clutch, and means responsive solely to excessive steering resistance for operating the clutch.

GEORGE P. BERRY.